United States Patent [19]

de Gennes

[11] 4,130,186

[45] Dec. 19, 1978

[54] RIBBED BRAKE SHOE SUPPORT PLATE FOR CYLINDRICAL RING TYPE BRAKE

[75] Inventor: Gérard de Gennes, Senlis, France

[73] Assignee: Societe Anonyme Francaise du Ferodo, Paris, France

[21] Appl. No.: 687,093

[22] Filed: May 17, 1976

[30] Foreign Application Priority Data

May 20, 1975 [FR] France .............................. 75 15587
Mar. 30, 1976 [FR] France .............................. 76 09113

[51] Int. Cl.$^2$ ............................................. F16D 53/00
[52] U.S. Cl. .................................... 188/76; 188/72.4; 188/250 B; 188/250 G; 192/73
[58] Field of Search ................... 188/71.1, 71.6, 72.4, 188/73.1, 73.5, 76, 78, 250 R, 250 A, 250 B, 250 G, 264 A, 264 AA, 365; 192/72, 73, 107 R, 107 T

[56] References Cited

U.S. PATENT DOCUMENTS

| | | |
|---|---|---|
| Re. 24,652 | 5/1959 | Fawick ............................ 192/107 T |
| 2,742,110 | 4/1956 | Super ................................... 188/76 |
| 3,357,525 | 12/1967 | Francois ............................... 188/76 |
| 3,853,207 | 12/1974 | Rist ..................................... 188/76 |

FOREIGN PATENT DOCUMENTS

| | | | |
|---|---|---|---|
| 253373 | 7/1966 | Austria ................................. 188/72.4 |
| 1075567 | 10/1959 | France ................................. 188/365 |
| 40212 | 12/1920 | Japan .................................. 188/73.1 |
| 1275306 | 5/1972 | United Kingdom .................... 188/73.1 |

*Primary Examiner*—Edward R. Kazenske
*Attorney, Agent, or Firm*—Charles E. Brown

[57] ABSTRACT

There is described a brake shoe for a ring type brake which means it has a cylindrical brake ring secured to a member to be braked. The brake shoe comprises a part-cylindrical, preferably sheet metal support plate having on one face a brake lining and on the opposite face an elongate rib extending generally between opposed edges of the support plate and having a substantially flat bearing surface. Preferably the rib is stamped in the sheet metal support plate and receives a complementary portion of the brake lining material therein. The rib may be disposed cordally of the support plate or parallel to the generatrices thereof. Two such ribs may be provided on a support plate parallel to each other though spaced at different distances from median plane thereof. The contact areas of the substantially flat bearing surface with the piston of the hydraulic unit associated therewith are preferably dissymmetrical about one or both of the median planes of the brake shoe. The hydraulic unit may also have two pistons each coacts with the rib(s). Both brake shoes for such a brake may be provided with such flat bearing rib(s).

15 Claims, 15 Drawing Figures

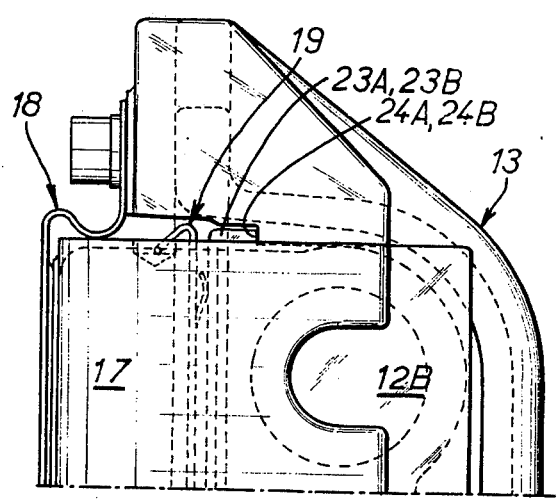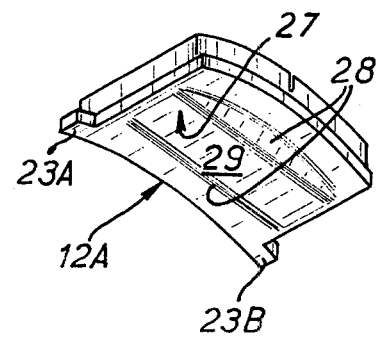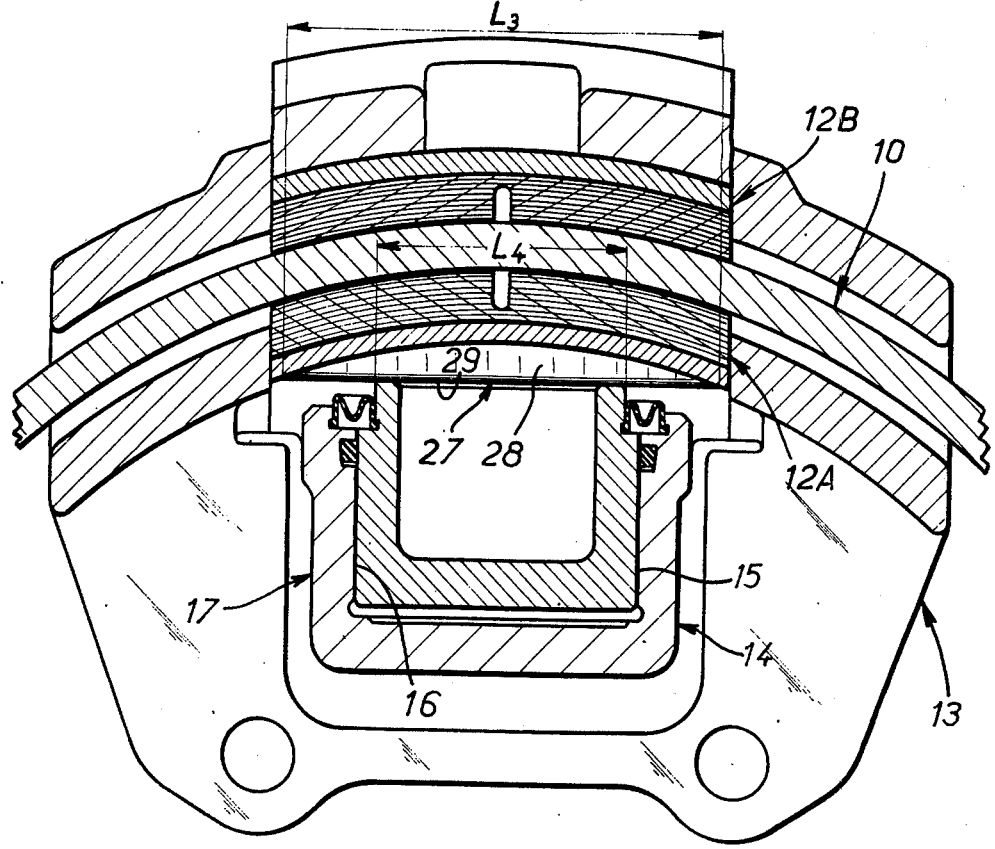

RIBBED BRAKE SHOE SUPPORT PLATE FOR CYLINDRICAL RING TYPE BRAKE

The present invention relates generally to ring type brakes having a member to be braked which is a cylindrical ring and radially inwardly and radially outwardly brake shoes adapted to the inner and outer surfaces respectively of the cylindrical ring and actuating means for urging the brake shoes in contact with the inner and outer surfaces of the member to be braked.

One of the problems which exist with brakes of this type is that the brake shoes, usually having a support plate carrying on one of their faces the brake lining, must have on the opposite face of the support plate a bearing surface cooperable with the associated actuating means. Obviously for simplification of the actuating means it is advantageous for the bearing surface to be flat.

In order to overcome this drawback one might think that it suffices to make the support plate of such a brake shoe substantially entirely planar.

Such an arrangement imposes on the design of the friction lining the utilization of an excessive amount of material in the median zone of the brake shoe, the active surface of the friction lining adapted to come into contact with the cylindrical brake ring being of complementary configuration, i.e., cylindrical.

It is an object of the present invention to provide an arrangement including a planar bearing surface on the support plate of a brake shoe opposite the surface carrying the friction lining, without employing an excessive amount of material for the friction lining.

A more specific object of the invention consists in a brake shoe for a ring type brake comprising a substantially part-cylindrical support plate carrying a friction lining on one of its faces and having on its opposed face at least one protruding elongate rib, extending generally between opposed edges of said support plate.

The interconnecting surface of the rib which may extend substantially perpendicular or parallel to generatrices of the part-cylindrical support plate surface is provided with a flat bearing surface adapted to cooperate with the associated actuating means, the surface of the plate support on which said rib is provided being otherwise substantially part-cylindrical.

Furthermore, the thickness of the friction lining along the entire support plate measured radially, may advantageously remain constant, longitudinally as well as circumferentially.

However according to a preferred embodiment of the invention which is particularly easy to carry out, the rib is stamped in the support plate. In this case, there is an additional consumption of friction lining material in line with the rib. Yet this additional friction lining material used is preferably only a fraction of that required had the support plate been made entirely planar as suggested above.

In addition the rib according to the invention provides an effective anchoring of the friction lining carried by the support plate.

Furthermore, when such a rib is parallel to the generatrices of the part-cylindrical support plate it provides the brake shoe with enhanced elasticity which may improve the conditions of friction contact of the brake shoe against the cylindrical brake ring thereby reducing the chance of uneven or askew wear.

There may be only one rib, or there may be two or more ribs.

With such ribs which, in practice, are arranged parallel to and spaced from one another and are provided with planar bearing surfaces, the brake shoe is well seated relative to the hydraulic unit of the actuating means which may have a single piston or two pistons disposed in parallel, or even a conventional transfer member of the actuating means used to associate the action of said piston(s) with the other relatively remote brake shoe.

According to the preferred arrangement in which there are two ribs it is advantageous for the ribs to be spaced from and parallel to the median plane (center line) of the corresponding brake shoe, generally different from each other. At least one of them may be set back along at least part of its length.

In fact with such an arrangement dissymmetrical areas of contact of the flat surface of the rib(s) with the actuating means are obtained so as to compensate at least in part for the natural tendency to wear obliquely or unevenly owing to the torque applied during braking about an axis parallel to the axis of the cylindrical brake ring owing to the tangential dragging force which is exerted.

A still further object of the invention is a brake of the type comprising a fixed support, a cylindrical brake ring to be braked, brake shoes disposed, respectively, radially inwardly and radially outwardly of the cylindrical brake ring, actuating means for urging the brake shoes against the respective surfaces of the cylindrical brake ring, each said brake shoe having a support plate and a friction lining carried thereon, at least one of said brake shoes having an elongate rib on the face of its support plate remote from its friction lining, extending between opposed edges of said support plate.

The rib or ribs disposed on the support plate may be disposed in accordance with one of two different arrangements.

Since we are dealing with actuating means comprising a hydraulic unit having at least one piston adapted to act directly on one brake shoe, the support plate of at least this brake shoe has at least one protruding rib, the piston having an axial blind bore as known per se with its open end facing the associated brake shoe; the rib(s) although bearing longitudinally on the piston provide laterally a free space for the flow of air adapted to cool the piston and the brake shoe.

Such air cooling thus permits by conduction through the corresponding end wall of the piston the cooling of the pressurized fluid adapted to act thereon and therefore favorable to prevent vapor lock which obviously would be detrimental to the operation of the brake.

Although the brake is preferably associated with actuating means, i.e. the hydraulic unit, on one side of a cylindrical brake ring, it goes without saying that such a brake shoe may also be utilized for the brake shoe to the other side of the cylindrical brake ring associated with the transfer member.

Other features and advantages of the invention will be brought out in the following description, by way of example, with reference to the accompanying schematic drawings, in which:

FIG. 3 is a detail in plan view of part of the brake viewed in the direction of arrow III in FIG. 1;

FIG. 4 is a perspective view of a brake shoe of the brake of FIGS. 1–3;

FIG. 5 is a view similar to that of FIG. 2 for an alternative embodiment of the brake according to the invention;

Figure 1:
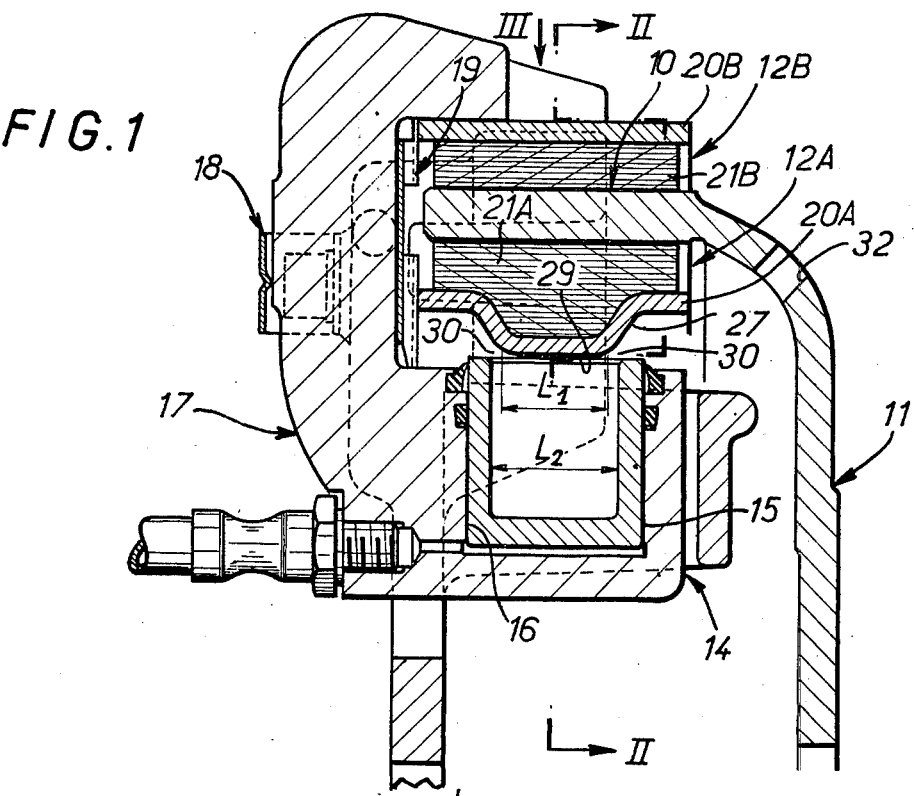
FIG. 1 is a sectional view taken along the axis of the brake equipped with the brake shoe according to the invention.
Figure 2:
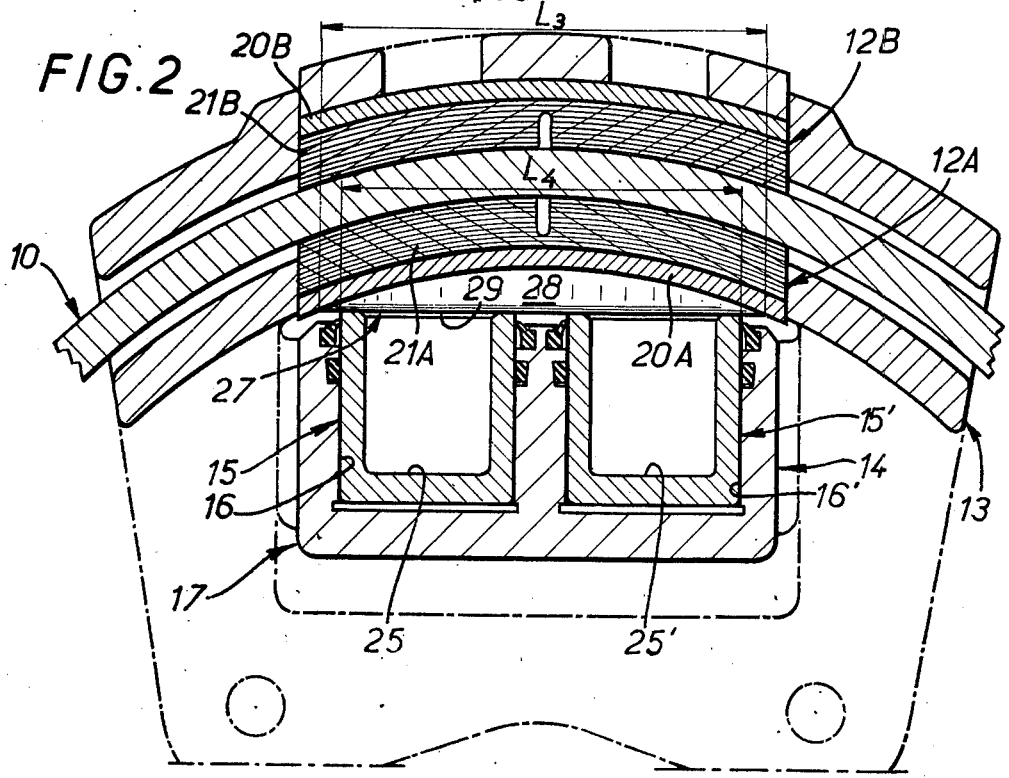
FIG. 2 is a sectional view taken along the line II—II in FIG. 1.

FIGS. 1–3 show a so-called cylindrical ring type brake, that is, a brake in which there is a generally cylindrical brake ring 10. In the illustrated the cylindrical brake ring 10 is integral with a transverse flange 11 which is adapted to be fastened to any kind of shaft to be braked. Such a brake will now be described in detail.

It is enough to recall that such a brake comprises two brake shoes 12A, 12B respectively disposed radially inwardly and outwardly of the cylindrical brake ring or member 10, a fixed support 13 and actuating means adapted to urge the brake shoes 12A, 12B against the radially inner and outer surfaces respectively of the cylindrical brake ring 10.

In the illustrated embodiment the brake shoe actuating means comprises a hydraulic unit 14 including pistons 15, 15' mounted for displacement in individual cylinders 16, 16' for urging in parallel the brake shoe 12A and a transfer member 17 which transmits the force exerted by the pistons 15, 15' against the brake shoe 12B when the pressurized operating fluid is admitted to the cylinders 16, 16'. The transfer member is mounted generally radially of the cylindrical brake ring 10.

In the illustrated embodiment the transfer member 17 is generally of C-shape, straddling the cylindrical brake ring or member opposite the transverse flange 11 with the brake shoes 12A, 12B received between the lateral portions of the transfer member and the cylindrical brake ring, respectively. The hydraulic unit 12 is disposed directly in the radially inner arm of the C-shaped transfer member. An arrangement of this type is generally known and is described in U.S. Pat. No. 3,933,227, assigned to the assignees of the present application.

Suitable means known per se are provided for securing the transfer member 17 to the fixed support 13, such means enabling limited rocking radial movement of the transfer member.

In practice, and as shown in the present embodiment, such means comprises a U-shaped retaining member 18 the lateral arms of which are fixed to the fixed support 13 and the interconnecting or bight portion extends around the transfer member generally perpendicular thereto, generally opposite the free edge of the cylindrical brake ring 10.

A spring 19 which bears against the brake shoes 12A, 12B which in turn bear against the fixed support maintain the transfer member 17 against the bight portion of the retaining member 18.

As is also known per se, each brake shoe 12A, 12B comprises a generally part-cylindrical support or backing plate 20A, 20B carrying on one of its faces a friction lining 21A, 21B secured thereto by appropriate means, for example by an adhesive.

Each of the support plates 20A, 20B of the brake shoes 21A, 21B is preferably metal, and comprises projecting lugs 23A, 23B adapted to abut complementary recesses 24A, 24B provided on the fixed support 13 accordingly.

The spring 19 which is interposed between the transfer member 17 and the brake shoes 12A, 12B urges the latter in such a direction that the projecting lugs 23A, 23B are in fact in abutment against the walls of the corresponding recesses 24A, 24B of the fixed support 12.

By reaction the spring 19 urges the transfer member 17 thereafter against the bight portion of the retaining member 18. A retaining member of this type is described in detail in above mentioned U.S. Pat. No. 3,933,227.

Each piston 15, 15', as is likewise known per se, is axially hollowed defining a blind bore 25, 25' opened facing the brake shoe 12A against which the pistons are adapted to bear directly.

As the brake shoe 12A is adapted to cooperate with the inner wall surface of the cylindrical brake ring 10, the convex face of its support plate 20A carries the associated friction lining 21A.

According to the invention the support plate 20A of the brake shoe 12A has an elongate protruding rib 27 on its concave face, i.e. the one which normally comes into contact with the pistons 15, 15', the rib extending generally between opposed edges of said support plate.

In the embodiment of FIGS. 1–4 there is one protruding rib, which extends substantially chordally between the longitudinal edges of the part-cylindrical support plate 20A, in other words substantially perpendicular to generatrices of the part-cylindrical support plate.

The protruding rib 27 includes two lateral surfaces 28 joined to the concave surface of the associated support plate 20A and a substantially flat interconnecting or bearing surface 29 joining the lateral surfaces 28. In operation, the pistons 15, 15' bear against the interconnecting surface 29 which thus provides a substantially flat surface for contact with the pistons; the pistons are aligned along the bearing surface 29 of the rib 27.

In the illustrated embodiment of FIGS. 1–4 the rib 27 is stamped in the part-cylindrical sheet metal support plate 20A. The lateral surfaces 28 of the rib 27 are accordingly slightly inclined toward each other in the direction of the axis of the part-cylindrical support plate.

In any event the rib 27 has a transverse dimension or width L1 measured approximately at the central surface 29 which is less than the corresponding dimension L2 of the blind bores 25, 25' in the pistons 15, 15'. Since the blind bores are in practice cylindrical with circular cross-section, the dimension L2 is obviously the diameter thereof.

Thus, as best seen in FIG. 1, the rib 27 advantageously leaves to each side of the lateral surfaces 28 of the rib 27 a free space 30 enabling communication of the blind bores 25, 25' of the pistons 15, 15' with the surroundings or ambient atmosphere thereby to effectively cool the interiors of the pistons 15, 15' and in turn the pressurized fluid in the corresponding cylinders 16, 16'. In this respect, i.e. air circulation, it is beneficial for a passage 32 to be provided in the transverse flange 11 on which the cylindrical brake ring 10 is disposed, in the vicinity of the hydraulic unit 14.

The general operation of such a brake is well known. When the pressurized fluid is delivered to the cylinders 16, 16' the pistons 15, 15' urge the brake shoe 12A against the inner surface of the cylindrical brake ring 10 and by reaction forces cause the transfer member 17 to urge the brake shoe 12B against the outer surface of the cylindrical brake ring 10, whereby the brake ring is thus clamped between the brake shoes 12A, 12B bringing about actual braking. Inversely, once the hydraulic pressure in the cylinders 16, 16' is released, the cylindrical brake ring is unclamped.

As will have been noted, and although the rib is preferably stamped in the support plate it requires only a small additional amount of material for making the friction lining 21A.

A very favorable compromise is thus struck between the requirements of minimizing material making up the friction lining and the provision of a flat bearing surface for coaction with the pistons 15, 15'.

It is readily understood that instead of stamping the rib 27 in the support plate it could be joined in the concave face thereof, in which case no additional friction lining material will be required to fill the rib in the support plate.

It should be noted, however, that by stamping out the rib 27 the friction lining 21A is anchored on the associated support plate 20 by a corresponding protruding portion mating with the inner walls of the rib 27 in the support plate.

As mentioned above in the present illustrated embodiment the hydraulic unit 14 is provided with two pistons 15, 15' operating in parallel and disposed adjacent each other along the rib 27.

Evidently it is possible to employ only one such piston 15, such as illustrated in the modified embodiment of FIG. 5. In all cases it is simply necessary that the length L3 of the rib be greater than the corresponding dimension L4 of the contact area of the pistons 15, 15' which comes to bear against the rib.

In the FIGS. 1-4 embodiment the contact area is defined by the zone which extends between the diametrically opposed edges of the pistons 15, 15' (see FIG. 2 in particular).

As to the embodiment of FIG. 5, the contact area is defined by the outer periphery of the corresponding end of the piston 15.

According to the modified embodiment of FIGS. 6-9, the support plate 20A of the brake shoe 12A is provided on its concave surface opposite its friction lining 21A with two ribs 35, 35' distinct from each other, each rib being associated with one of the pistons.

In this embodiment the ribs 35, 35' are formed by an appropriate deformation of the support plate 20A, by stamping for example, as in the preceding embodiments. The ribs 35, 35' are parallel to each other and to the axis of the part-cylindrical support plate, and thereby to the axis of the cylindrical brake ring 10.

Each rib 35, 35' has two lateral surfaces 36, 36' joining it to the concave surface of the corresponding support plate 20A, lateral surfaces 36, 36' being either parallel or slightly convergent towards each other in the direction of the axis of the cylindrical brake ring 10 and a substantially flat bearing surface 37, 37' joining pairs of lateral surfaces 36, 36'.

The substantially flat bearing surface 37 of the rib 35 is in contact with the corresponding free peripheral end or edge of the piston 15 and the substantially flat bearing surface 37' of the rib 15' is in contact with the corresponding free end or edge of the piston 15'.

The width or transverse extent of each rib 35, 35' measured approximately at the substantially flat surface 37, 37' is L1, L2 which is less that the corresponding dimension L2, L'2 of the blind bores 25, 25' in the pistons 15, 15', in other words less than the diameter of the blind bores in the pistons which are cylindrical of circular cross section.

Figure 7:
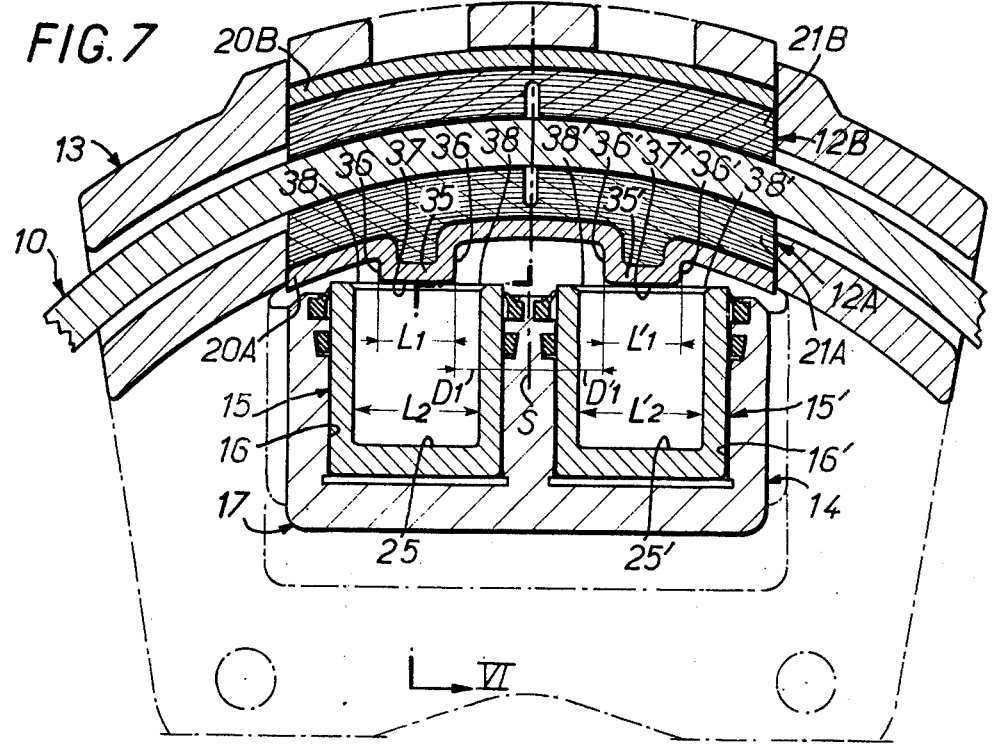
FIG. 7 is a sectional view taken along the line VII—VII in FIG. 6.
Figure 8:
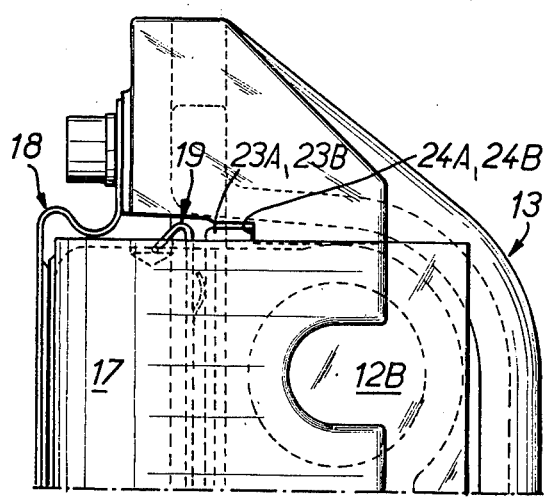
FIG. 8 is a detail in plan view of part of the brake viewed in the direction of the arrow VIII in FIG. 6.
Figure 9:
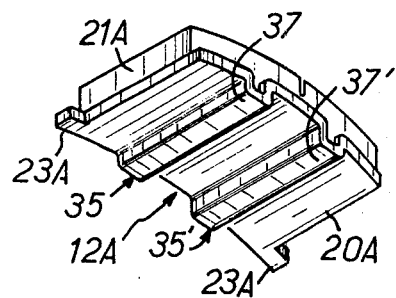
FIG. 9 is a perspective view of the brake shoe used in the embodiment of the brake of FIGS. 6–8.

Thus, as clearly visible in FIG. 7, each rib 35, 35' advantageously leaves free spaces 38, 38' to both sides of the lateral surfaces 36, 36' enabling communication of the interiors of the blind bore 25, 25' with surrounding atmosphere thereby favoring the satisfactory cooling of the interior of the pistons 35, 35' and consequently the pressurized fluid in the chambers defined by the pistons 15, 15' and cylinders 16, 16'.

Figure 6:
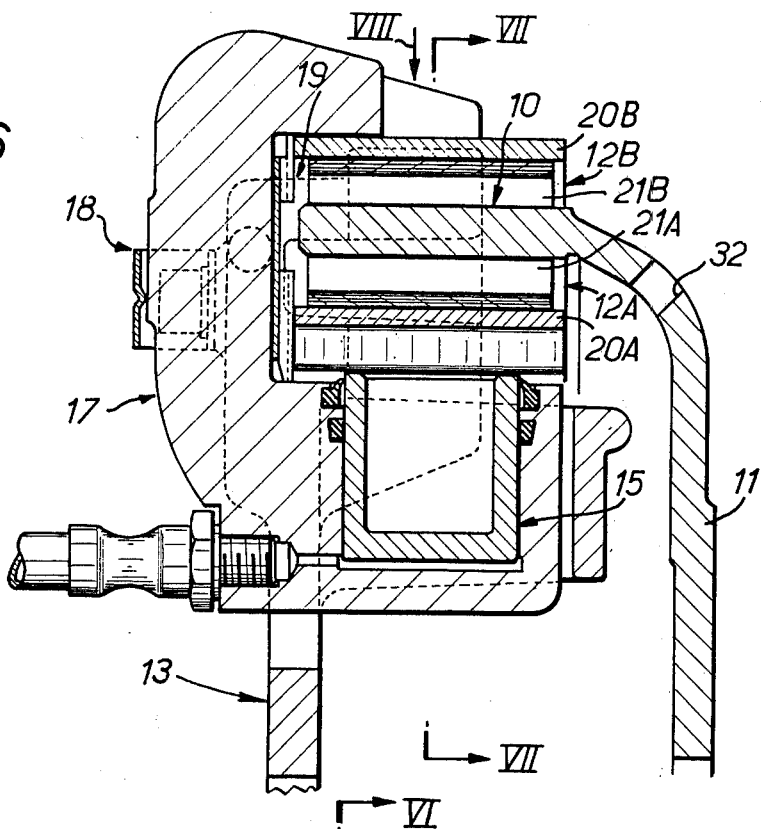
FIG. 6 is an axial sectional view of another embodiment of the invention taken generally along the line VI—VI of FIG. 7.

In this respect it is also beneficial, as in the preceding embodiments, to have air flow passages 32 in the flange 11 connected to the cylindrical braking member 10, proximate to the hydraulic unit 14, FIG. 6.

The operation of this embodiment is substantially the same as that described above.

In the preceding embodiments the transverse extent or width L1, L'1 of the rubs 35, 35' of the brake shoe 12A, defined above, are substantially equal to each other. The ribs 35, 35' are respectively spaced at distances D1, D'1 from the median plane S of the brake shoe, parallel to the axis corresponding to the part-cylindrical surface of the support plate, in the embodiment of FIG. 6 these distances D1, D'1 are shown as being equal.

For reasons which will be brought out hereinafter, the widths or transverse extents L1, L'1 may be different from each other and/or the distances D1, D'1 may be different from each other. Similarly, although the substantially flat surfaces 37, 37' of the ribs 35, 35' are generally depicted as being coplanar, this need not always be the case.

Figure 10:
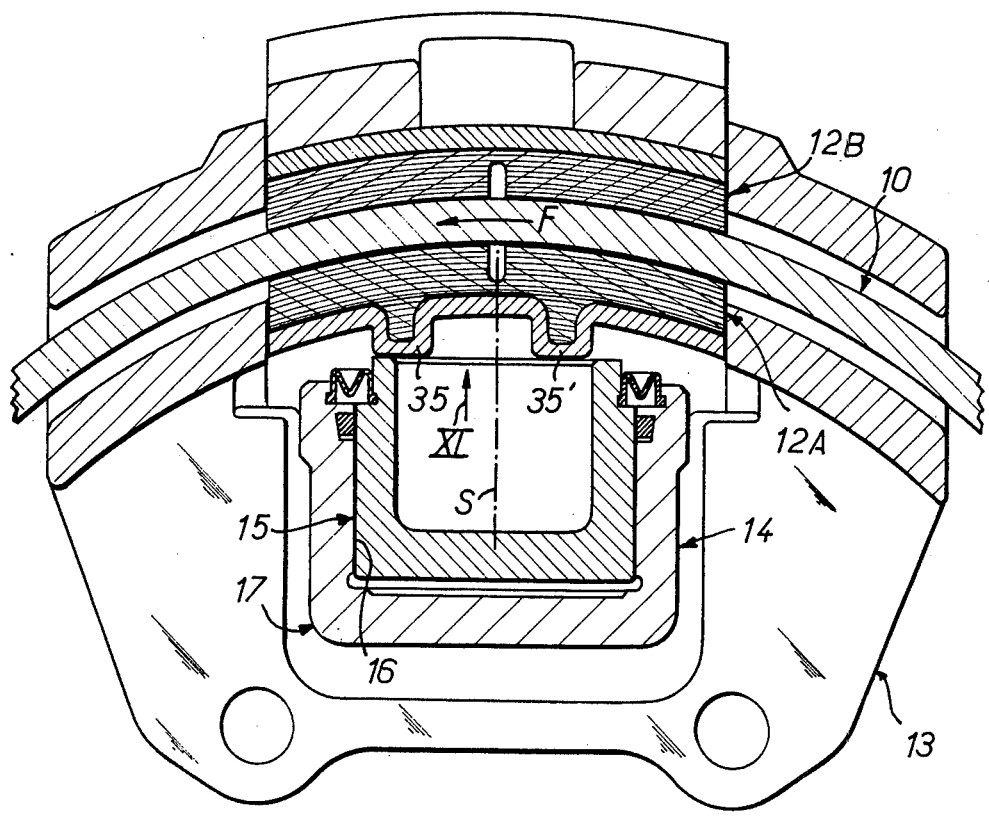
FIG. 10 is a view similar to that of FIG. 7 for another type of brake.

FIG. 10 illustrates an alternative embodiment in which a double-ribbed support plate is used in association with a hydraulic unit 14 having a single piston 15. In this embodiment the ribs 35, 35' of the support plate 12A are both in contact with the corresponding free outer edge of the piston 15 along their substantially flat bearing surfaces 37, 37'. But in this embodiment the ribs 35, 35' are preferably disposed at different distances D1, D'1 from the median plane S of the brake shoe, parallel to the axis of the cylindrical braking member, as defined above.

Figure 11:
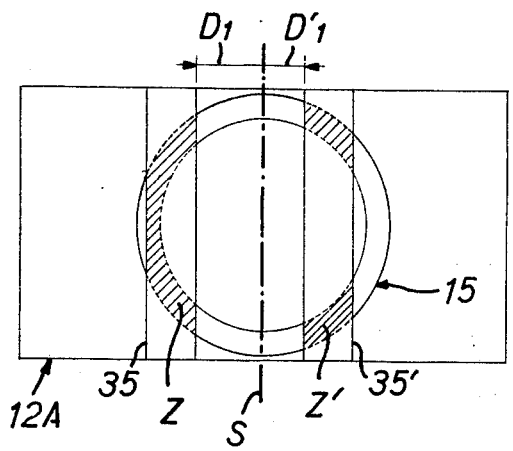
FIG. 11 is a diagrammatic view, in plan, viewed in the direction of arrow XI in FIG. 10, illustrating the seating of a support plate of a brake shoe on the actuating means which are in contact therewith.

As it will be best seen in the schematic FIG. 11 shaded contact areas Z, Z' of the ribs 35, 35' against the outer edge of the piston 15 are overall dissymmetrical relative to the axial plane of the piston parallel to the ribs and therefore, to the median plane S of the brake shoe 12A which, in practice, is coincident therewith.

Referring again to FIG. 10 where it is better shown, the dissymmetry of the contact areas results in a dissymmetry of the seating of the brake shoe 12A which tends to counterbalance the effects of the rocking torque to which the brake shoe is subject during braking, owing to the tangential dragging force exerted by the cylindrical brake ring 10 in the direction of the arrow F in FIG. 10.

In the preceding arrangement it is understood that the ribs 35, 35' are substantially parallel to the axis or generatrices of the part-cylindrical surface of the support plate.

Figure 12:
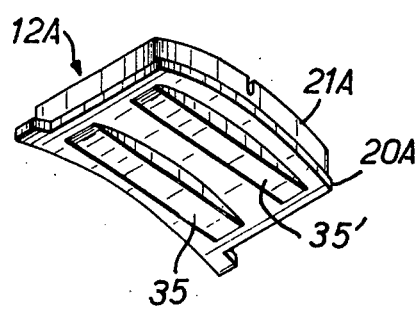
FIGS. 12 and 13 are views, similar to that of FIGS. 4 and 9, each illustrating a different embodiment of the brake shoe according to the invention.
Figure 13:
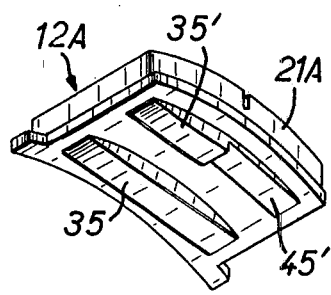

In the modified embodiments of the double-ribbed support plate shown in FIGS. 12 and 13, the ribs 35, 35' are disposed perpendicular to the axis of the part-cylindrical support plate which was also the case in the embodiment of FIG. 4.

In this case, assuming the hydraulic unit comprises two pistons, the pistons are arranged next to each other and along the length of the ribs 35, 35' of the support plate, their free peripheral ends or edges coming to bear thereagainst.

In addition, in this arrangement, the ribs 35, 35' are disposed cordally of the cylindrical brake ring 10 between the longitudinal edges, or circumferential limits of the part-cylindrical support plate 20A, and their transverse dimension or width is such that at least a free space is formed permitting the interior of the blind bores of the pistons to communicate with the surroundings.

In case it is desirable to have different bearing contact to each side of the aforesaid median plane of the brake shoe, at least one of the ribs 35, 35' (rib 35 in the illustrated embodiment of FIG. 13) may have a cut back or depressed portion 45' along part of its length.

Figure 14:
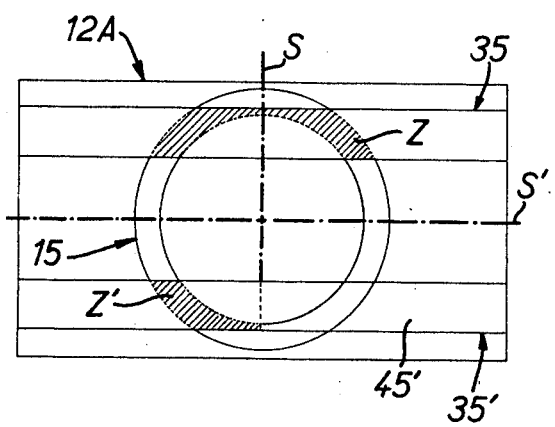
FIG. 14 is a diagrammatic view similar to that of FIG. 11 for the modified embodiment of the brake shoe shown in FIG. 13.
Figure 15:
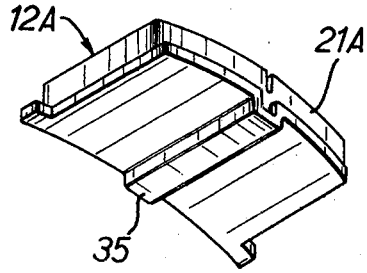
FIG. 15 is a view similar to that of FIGS. 4 and 9 showing a further embodiment of the brake shoe of the present invention.

As depicted in FIG. 14, the contact areas Z, Z' of the ribs 35, 35' are overall dissymmetrical about the axial plane S' of the piston parallel to the ribs. This axial plane S' shown in FIG. 14 is thus perpendicular to the previously defined median plane S of the brake shoe 12A. The axial plane S' moreover coincides with the median plane parallel to the ribs 35, 35' equidistant from the corresponding circumferential limits of the support plate 20A.

According to the illustrated embodiment of FIG. 10 the support plate 20A has only one rib 35 (as described more particularly with respect to the embodiment of FIGS. 1-5) but this rib 35 is disposed parallel to the generatrices or circumferential limits of the part-cylindrical support plate 20A as described with reference to FIGS. 6-9.

The present invention is of course not limited to the embodiments described and illustrates hereinabove but encompasses all alternatives or modifications, and combinations of the various elements.

In particular as to the illustrated embodiments of FIGS. 12 and 13 the ribs 35, 35' as in the case of FIG. 10, could obviously be dissymmetrical about the median plane parallel to the axis of the part-cylindrical support plate or the cylindrical brake ring.

Furthermore, the invention covers the brake shoe 12B, i.e., the brake shoe supporting a brake lining adapted to bear against the concave surface of the cylindrical brake ring particularly where it is deemed desirable for free surface of the support plate in contact with the transfer member of the actuating means to have a flat or planar surface. In this case the dissymmetry of the rib contact areas against the transfer member which for our purposes here can be considered to be the extension of the hydraulic unit will be around the plane of symmetry of the brake shoe, i.e., parallel to the axis of the cylindrical brake ring.

Finally, such a brake support plate, whether it is for the brake shoe 12A or 12B, may have a combination of ribs parallel to the generatrices of the associated support plate intersecting with one or more ribs perpendicular to the generatrices of the support plate.

What is claimed is:

1. A brake shoe for a ring type brake having a cylindrical brake ring comprising a generally part-cylindrical support plate having remote faces defining a convex surface and a concave surface, a brake lining on one of the faces of said support plate and at least one elongate protruding rib on the opposite face of said support plate, said rib extending substantially from one edge of said support plate to an edge opposite thereto and comprising two lateral surfaces joining said rib to said opposite face of said support plate and a substantially planar surface interconnecting said lateral surfaces and extending only between said lateral surfaces to define the sole bearing surface on said opposite face of said support plate adapted to bear against actuating means for said brake shoe, said two lateral surfaces and said planar surface of said rib defining a depression in said support plate and said brake lining having a portion projecting into said depression and forming a mechanical interlock with said support plate.

2. The brake shoe according to claim 1, wherein said rib extends substantially chordally of said part-cylindrical support plate, perpendicular to the generatrices thereof.

3. The brake shoe according to claim 1, wherein said rib extends substantially parallel to the generatrices of said part-cylindrical support plate.

4. The brake shoe according to claim 1, wherein said support plate is of sheet metal and said rib is an integral stamped portion therein.

5. The brake shoe according to claim 1, wherein the convex surface of said part-cylindrical support plate carries the brake lining and said rib protrudes from the concave surface of said part-cylindrical support plate.

6. A brake shoe according to claim 1, wherein there are two of said ribs and said two ribs are distinct from each other.

7. The brake shoe according to claim 6, wherein said two ribs are disposed parallel to each other.

8. The barke shoe according to claim 7, wherein said support plate has a longitudinal median plane, said ribs are parallel to the longitudinal median plane of said part-cylindrical support plate, and the distances of said ribs from said longitudinal median plane are different.

9. A caliper type ring brake having a fixed support, cylindrical brake ring, two brake shoes respectively disposed radially inwardly and outwardly of said brake ring, hydraulic actuating means for urging said brake shoes into operative contact with said brake ring, at least one of said brake shoes comprising a generally part-cylindrical support plate carrying a brake lining on one of its faces and at least one elongate protruding rib on the opposite face of said support plate, said rib extending substantially from one edge of said support plate to an edge opposite thereto and having two lateral surfaces joining said rib to said opposite face of said support plate and a substantially planar surface interconnecting said lateral surfaces and extending only between said lateral surfaces to define the sole bearing surface on said opposite face of said support plate adapted to bear against said actuating means, said two lateral surfaces and said planar surface of said rib defining a depression in said support plate and said brake lining having a portion projecting into said depression and forming a mechanical interlock with said support plate.

10. The brake according to claim 9, wherein said actuating means includes a hydraulic unit having a piston, said piston having a blind bore opening facing said one brake shoe, the edge of the piston around its open end cooperating with said substantially planar bearing surface of said rib.

11. The brake according to claim 10, wherein said hydraulic unit comprises two pistons, said rib on said support plate being perpendicular to the generatrice of the part-cylindrical support plate, and wherein the axis of said pistons are disposed in a plane generally parallel to the center line of said rib.

12. The brake according to claim 10, wherein said rib bears against only part of said edge of said piston around its one end thereby providing free air access between the ambient atmosphere and the interior of the blind bore of said piston.

13. The brake according to claim 9, wherein said actuating means has an axial plane of symmetry, there are two said ribs on said one brake shoe, contact areas of said ribs with the actuating means being disposed symmetrically about the axial plane of symmetry of said actuating means.

14. The brake according to claim 9, wherein there are two of said ribs, said actuating means includes a hydraulic unit having a piston, said piston having a fluid bore opening facing said one brake shoe, and wherein contact areas of said ribs with the edge of the piston around its open end are disposed symmetrically about an axial plane of the piston parallel to said ribs.

15. A brake shoe for a ring type brake having a cylindrical braking ring comprising a generally part-cylindrical support plate having remote faces, a brake lining on one of the faces of said support plate, a pair of parallel spaced apart elongate protruding ribs on the opposite face of said support plate, each of said ribs having two lateral surfaces joining the associated rib to said opposite face and having a substantially planar bearing surface interconnecting said lateral surfaces, at least one of said ribs having a set back portion depressed relative to the associated substantially planar bearing surface and extending along part of said at least one of said ribs.

* * * * *